United States Patent
Oberle et al.

[11] Patent Number: 6,050,764
[45] Date of Patent: Apr. 18, 2000

[54] MEASURING DEVICE HAVING A CYLINDRICAL CONNECTION PIECE AND A FASTENING COLLAR THEREAROUND

[75] Inventors: Klaus-Peter Oberle, Weilheim; Markus Mornhinweg, Gundelfingen, both of Germany

[73] Assignee: Endress + Hauser GmbH + Co., Germany

[21] Appl. No.: 08/940,620

[22] Filed: Sep. 30, 1997

Related U.S. Application Data

[60] Provisional application No. 60/030,469, Nov. 13, 1996.

[30] Foreign Application Priority Data

Oct. 23, 1996 [DE] Germany ................. 196 43 751

[51] Int. Cl.⁷ ..................................... F16B 19/00
[52] U.S. Cl. .................... 411/354; 411/265; 411/266; 411/268; 411/270; 411/277; 411/278
[58] Field of Search .................... 411/265–268, 270, 411/277, 278, 354; 403/368, 370, 371; 285/341, 342, 216, 346

[56] References Cited

U.S. PATENT DOCUMENTS

| | | |
|---|---|---|
| 1,710,416 | 4/1929 | Goeller . |
| 2,064,440 | 12/1936 | Meeker . |
| 2,307,386 | 1/1943 | Braxton . |
| 2,377,891 | 6/1945 | Laue ........................................... 411/265 |
| 2,457,648 | 12/1948 | Donner ...................................... 411/265 |
| 3,352,341 | 11/1967 | Schertz ...................................... 411/270 |
| 4,203,306 | 5/1980 | Sehlbach . |
| 4,850,777 | 7/1989 | Lawrence . |
| 5,161,928 | 11/1992 | Burdick ...................................... 411/270 |
| 5,408,168 | 4/1995 | Pfandler . |
| 5,440,455 | 8/1995 | Rottmar . |
| 5,535,629 | 7/1996 | Gerdes et al. . |

FOREIGN PATENT DOCUMENTS 1041024  10/1953  France ...................................... 411/256

*Primary Examiner*—Flemming Saether
*Attorney, Agent, or Firm*—Bose McKinney & Evans LLP

[57] ABSTRACT

A measuring device is provided, having a cylindrical connection piece (1), having a collar (2) which engages around at least one section of the connection piece (1) and is to be fastened at a measuring location, having a restraining means, by which the connection piece (1) is fastened in the collar (2), having an annular seal (3), which is arranged in the collar (2) and bears in a sealing manner against the connection piece (1), and having a thrust ring (4) which is releasably fastened in the collar (2), and, in an end position, puts the seal (3) under pressure in the axial direction, with which device mounting and demounting at the measuring location take place in one operation and with which device, during mounting, the fastening of the connection piece (1) takes place before or at the same time as the restraining of the seal (3), and with which device, during demounting, first of all the seal (3) is released and then the fastening. This is achieved by the restraining means being designed as a clamping means which can be released from a clamped state just by the action of an external force, and by the clamped state being effected by the end position of the thrust ring (4).

8 Claims, 4 Drawing Sheets

MEASURING DEVICE HAVING A CYLINDRICAL CONNECTION PIECE AND A FASTENING COLLAR THEREAROUND

This application claims benefit of Provisional Application Ser. No. 60/030,469, filed Nov. 13, 1996.

BACKGROUND OF THE INVENTION

The invention relates to a measuring device. The measuring device includes a cylindrical connection piece and a collar which engages around at least one section of the connection piece and is fastened at a measuring location. A restraining means fastens the connection piece in the collar. An annular seal is arranged in the collar and bears in a sealing manner against the connection piece. A thrust ring is releasably fastened in the collar and, in an end position, puts the seal under pressure in the axial direction.

Such measuring devices are commercially available. The cylindrical connection piece is fastened at a measuring location, for example in an opening on a tank or container. Examples are measuring probes, in particular capacitive filling level probes and vibration limit switches. In many applications, for example in chemistry or in the food industry, the containers are under pressure.

The connection piece is typically inserted into a tubular collar, which is screwed on at the measuring location, for example by means of a thread formed on it. The sealing of the interior space of the container with respect to the ambient takes place by the seal. This seal usually rests on a shoulder surface in the collar and the thrust ring has to be screwed into the collar. In the screwed-in state, the thrust ring is in an end position in which it presses with an annular end face against the seal. This restraining action between the shoulder surface and the annular surface makes the seal effective.

The restraining means usually comprises fixing screws which have to be screwed against the connection piece through through-bores which are arranged on the side facing away from the seal, penetrate the thrust ring and run perpendicularly with respect to the longitudinal axis of the latter.

An example of this prior art is represented in FIG. 1 and explained in more detail below.

One disadvantage of these measuring devices is that the fixing screws have the effect of a punctiform restraining action on the connection piece. The connection piece may be damaged, for example pressed in, by this localized loading. If the measuring device is used repeatedly, there is the risk of the damaged location being next to the seal and of the sealing quality being impaired.

When removing the measuring device, first of all the restraint of the connection piece in the collar has to be released and only then the restraint of the seal. After releasing the restraint, the connection piece is movable in the collar. It therefore goes without saying that the restraint may be released only when the pressure prevailing at the measuring location is equal to the ambient pressure. Otherwise, the measuring device could be forced out of the collar by a positive pressure prevailing at the measuring location, or be sucked into the container by a negative pressure prevailing at the measuring location. Under some circumstances, it is only with difficulty that the measuring device can be retrieved from the container.

A further disadvantage is that, when fitting on the measuring device, first of all the restraint of the seal takes place, and only then the fastening of the connection piece in the collar.

A further disadvantage is that, during mounting, two operations are required, one for restraining the seal and another for fastening the connection piece. This applies analogously for the demounting of the measuring device.

SUMMARY OF THE INVENTION

It is an object of the invention to specify a measuring device with which mounting and demounting at the measuring location take place in one operation. Furthermore, during mounting, the fastening is to take place before or at the same time as the restraining of the seal and, during demounting, first of the all the seal is to be released and then the fastening. Also, during demounting, the user is to be automatically given a warning if the pressure prevailing at the measuring location is different from the ambient pressure.

The invention achieves all this by the restraining means being designed as a clamping means which can be released from a clamped state just by the action of an external force, and by the clamped state being effected by the end position of the thrust ring.

According to a development of the invention, when the thrust ring is released a positive pressure prevailing at the measuring location acts on the clamping means and displaces it in the axial direction until it engages in a first snap-in means. In the engaged state, the restraining means is connected to the thrust ring fixedly or via a second snap-in means, with the result that the thrust ring is fixed in its position and cannot be released fully from the collar.

According to a refinement, the clamping means has a clamping cone with an axial through-bore and a through-gap, running in the axial direction, and a fixing element with an inner conical lateral surface, and the fixing element is pressed onto the clamping cone by the thrust ring.

According to a refinement of the invention, the fixing element and the thrust ring are a single one-part mounting element.

According to a further refinement, the clamping cone rests with a base surface, facing away from the fixing element, on the seal or on a spacer ring resting on the seal, and the seal rests on a shoulder surface arranged in the collar.

According to a further refinement, a snap ring is fitted in a [sic] on the side of the clamping cone facing away from the seal in an annular groove arranged in the collar.

According to a further refinement, the angles of inclination of the cones of the clamping cone and the fixing element are in each case acute angles, which in particular do not exceed 8°.

According to a further refinement, the thrust ring rests with an annular surface of a radially inwardly extending shoulder ring on a shoulder of the fixing element.

According to a further refinement, the thrust ring can be separated from the collar only by at least one turn about its longitudinal axis. The thrust ring may be screwed into the collar.

According to a development of the invention, the thrust ring is fastened on the collar by means of at least one screw arranged parallel to the longitudinal axis of the thrust ring, and in the thrust ring there is arranged at least one pair of bores, which has a first bore and a second bore, the first bore having an internal diameter which is smaller than the largest screw diameter, the second bore having an internal diameter which is larger than the largest screw diameter, and the first bore and the second bore being connected to each other by a channel, the width of which is smaller than the largest screw diameter.

According to a refinement of the last-mentioned development, the first bore has at its end facing away from the collar in each case a section in which a section of a screw head of the screws, facing toward the thrust ring, is countersunk, and the screws cannot be unscrewed fully from the collar.

According to a development of the invention, a first snap-in means is provided, by which a raising of the fixing element in the collar and/or a lifting out of the fixing element from the collar in the direction away from the seal is possible only in at least one specific position, to be brought about by turning the fixing element about its longitudinal axis.

According to a first refinement of the last-mentioned development, the first snap-in means is formed by at least one snap-in pin, arranged in the collar, and a peripheral shoulder formed on the fixing element, and the shoulder has at least one recess.

According to a second refinement of the last-mentioned development, the first snap-in means is formed by at least one snap-in pin, arranged in the collar, and at least one guide groove, arranged in the fixing element. The snap-in pin has to be pushed into the guide groove during mounting. As this takes place, the fixing element undergoes a turning about its longitudinal axis.

According to a further refinement of this second refinement, the guide groove has at least one blind bore, which runs parallel to the longitudinal axis of the fixing element.

According to a development of the invention, a pressure prevailing at the measuring location acts on the fixing element when the thrust ring is released and displaces said fixing element in the axial direction until it engages in a first snap-in means.

According to a development of the last-mentioned development, in the engaged state the fixing element cannot be turned and is connected to the thrust ring fixedly or via a second snap-in means, with the result that a turning of the thrust ring is possible only with a turning of the fixing element, and the thrust ring can be released only by the turning of the collar.

According to a refinement of the last-mentioned development, the second snap-in means has at least one snap-in lug, in particular one which can be lowered by the action of an axial force, which is arranged on an annular surface of the thrust ring facing toward the fixing element, and a corresponding number of snap-in notches, arranged in the fixing element on its end facing toward the thrust ring.

According to a further refinement of the last-mentioned development, the snap-in notches have in each case a step as a first limitation and a ramp as a second limitation, the ramp being arranged in each case on that side of the snap-in notch over which a snap-in lug located above the snap-in notch moves first during the screwing in of the thrust ring.

One advantage of the invention is that the seal automatically becomes unsealed when the fastening of the connection piece is opened. A pressure equalization between the measuring location and the ambient can consequently occur, and causes a whistling.

The user is thus warned of the difference in pressure and can react correspondingly with safety in mind.

The invention and further advantages are now described in more detail with reference to the figures of the drawing, in which a measuring device belonging to the prior art and three exemplary embodiments of measuring devices according to the invention are represented; identical parts are provided in the figures with identical reference numbers.

BRIEF DESCRIPTION OF THE DRAWINGS

FIG. 2b shows a plan view of the clamping cone from FIG. 2a;

FIG. 3b shows a perspective view of the fixing element from FIG. 3a;

FIG. 4c shows a perspective view of the mounting element from FIG. 4a.

DETAILED DESCRIPTION OF THE INVENTION

Figure 1:
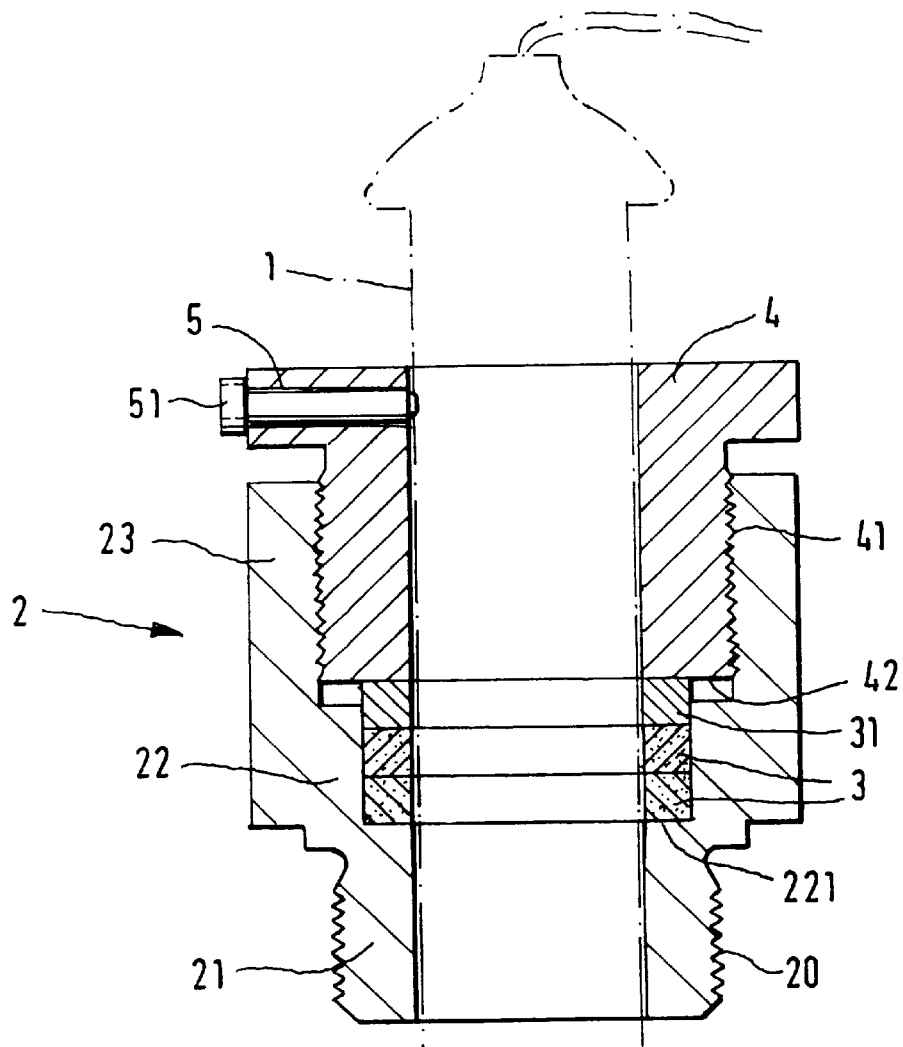
FIG. 1 shows in longitudinal section a measuring device belonging to the prior art.

Represented in FIG. 1 in longitudinal section is a measuring device which corresponds to the prior art on which the invention is based.

The measuring device has a cylindrical connection piece 1, which is arranged in a collar 2. The latter engages around a section of the connection piece 1. The collar 2 is fastened at a measuring location by an external thread 20.

It has a first section 21, the internal diameter of which is equal to the external diameter of the connection piece 1. This is adjoined by a second section 22, which has a larger internal diameter than the first. This is adjoined by a third section 23, the internal diameter of which is in turn larger than the internal diameter of the second section 22. Between the first section 21 and the second section 22 there is a shoulder surface 221, on which an annular seal 3 rests. The latter also bears with a cylindrical lateral surface against the inner wall of the collar 2. The seal 3 is, for example, a ring made of graphite or of an elastomer. Lying on the seal 3 is a spacer ring 31, for example made of metal.

A thrust ring 4 is provided, which engages around a section of the connection piece 1 and is screwed into the section 23 of the collar 2 by an external thread 41. The internal diameter of the thrust ring 4 and the spacer ring 31 are equal to the external diameter of the connection piece 1. In an end position, i.e. in the screwed-in state, the thrust ring 4 presses with an end face 42, facing toward the seal, against the spacer ring 31, by which in turn the seal 3 is pressed. It is restrained in the axial direction between the shoulder surface 221 and the end surface 42 of the thrust ring 4 and bears in a sealing manner against the connection piece 1. The spacer ring 31 has the effect that only forces in the axial direction act on the seal 3. If the thrust ring 4 were mounted directly onto the seal 3, the latter could be twisted or warped by the turning movement of the thrust ring 4. For screwing the thrust ring 4 into the collar 2, both the thrust ring 4 and the collar 2 have, for example, the outer geometry of a hexagon.

The fastening of the connection piece 1 in the collar 2 is performed by at least one fixing screw 51. The latter is screwed against the connection piece 1 through a through-bore 5, arranged in the thrust ring 4. The bore 5 is located on the side of the thrust ring 4 facing away from the seal and runs perpendicularly with respect to the longitudinal axis of said ring.

Figure 2A:
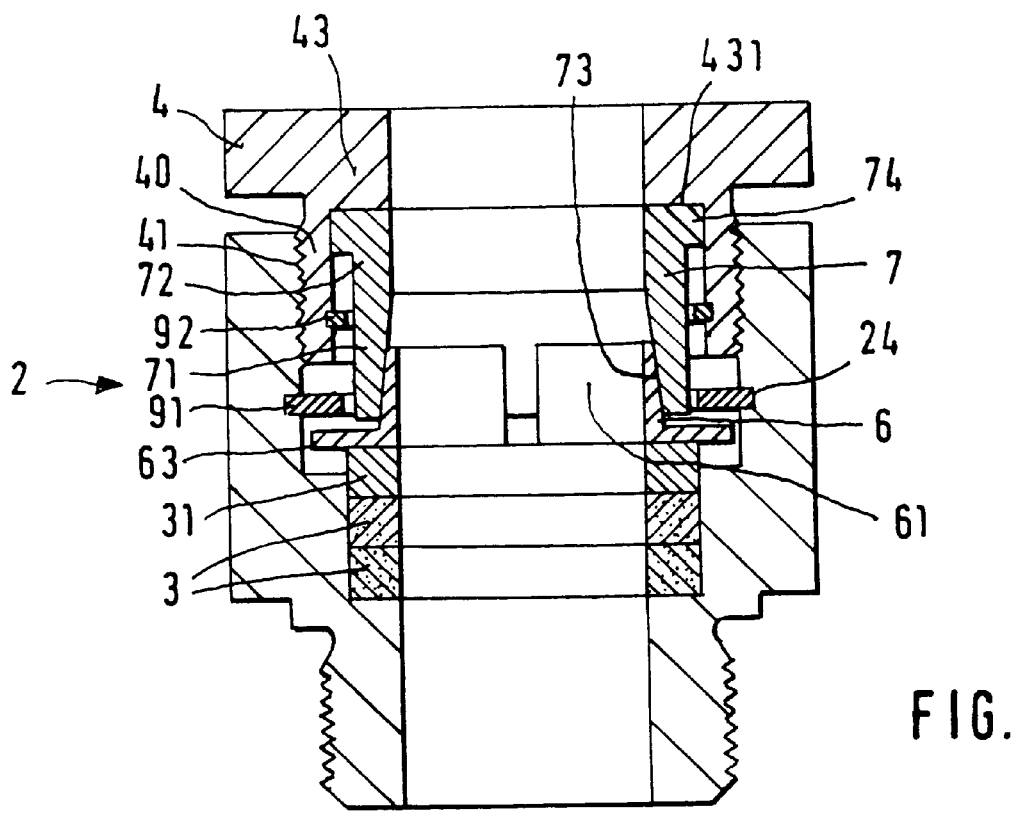
FIG. 2a shows a longitudinal section of a first exemplary embodiment of a measuring device according to the invention.

Represented in FIG. 2a in longitudinal section is a first exemplary embodiment of a measuring device according to the invention. The collar 2 and the arrangement of the seal 3 and of the spacer ring 31 therein coincide with that represented in FIG. 1 and are therefore not described in any more detail here. For better overall clarity, the connection piece 1 is not represented in FIG. 2a. It can be adopted identically from FIG. 1.

Arranged on the spacer ring 31 is a clamping cone 6. The latter is also conical and has an axial through-bore 61, the internal diameter of which is equal to the external diameter of the connection piece 1.

Figure 2B:
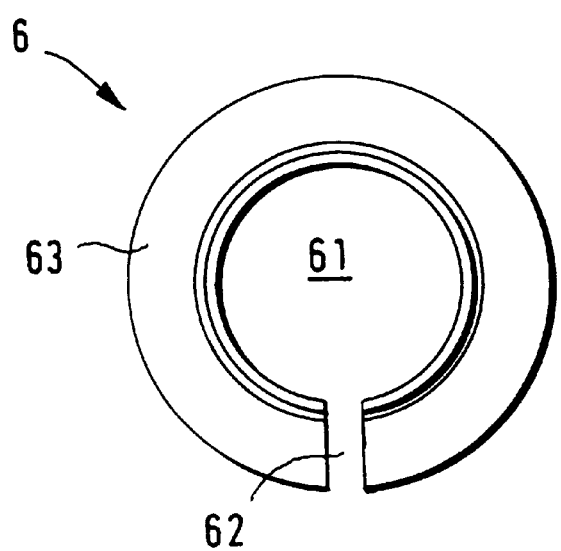

FIG. 2b shows a plan view of the clamping cone 6. A through-gap 62, running through the clamping cone 6 in the axial direction, is provided, with the result that the clamping cone 6 can be pressed together. In the plan view, the clamping cone 6 has the shape of a convex-angled circular-ring segment. Formed onto the end of the clamping cone 6 facing toward the seal is a radially outwardly extending washer 63. The clamping cone 6 rests with a bas e surface of the washer 63, facing away from the cone, on the spacer ring 31. The spacer ring 31 is not absolutely necessary. It is also possible for the clamping cone 6 to lie with the washer 63 directly on the seal 3. The external diameter of the clamping cone 6 decreases in the direction away from the seal.

Fitted onto the clamping cone 6 is a fixing element 7. The latter is an essentially tubular element, which has a section 71, facing toward the clamping cone, with a conical inner volume, and a tubular section 72, facing away from the clamping cone. The internal diameter of the section 72 is equal to the external diameter of the connection piece 1. The internal diameter of the section 71 increases in the direction toward the clamping cone and is adapted in its shape to the geometry of the clamping cone 6. The fixing element 7 consequently rests with an inner conical lateral surface 73 with an exact fit on the clamping cone 6.

The angles of inclination of the cones of the clamping cone 6 and the fixing element 7 are in each case acute angles and preferably less than 8°. If the clamping cone 6 and the fixing element 7 are clamped on each other by the action of a force, they are not released from each other on their own account once the action of the force ceases. A renewed exertion of force, albeit less, is required in order to release the two components from each other. This effect, caused by the angle of inclination, is also referred to as self-locking.

Formed onto the end [lacuna] fixing element 7 facing away from the clamping cone there is on the outside a shoulder ring 74.

A thrust ring 4 is provided, which is screwed into the collar 2. This comprises a tube 40 with an external thread 41. The tube 40 surrounds a section of the fixing element 7 facing away from the seal. On the side facing away from the fixing element, there is formed onto the tube 40 a radially inwardly extending shoulder ring 43. The thrust ring 4 rests with an annular surface 431 of the shoulder ring 43, directed into the interior space of the collar, on the shoulder ring 74 of the fixing element 7.

Arranged in the collar 2 is a peripheral groove 24, into which a snap ring 91 is fitted. The groove 24 is located in the collar 2 on that side of the clamping cone 6 facing away from the seal. A snap ring is a convex-angled circular-ring segment the dimensions of which are chosen such that it can only be fitted into the groove 24 by pressing together. The internal diameter of the snap ring 91 is smaller than the external diameter of the washer 63. The snap ring 91 prevents the clamping cone 6 being taken out or falling out of the collar 2.

In an analogous way, the fixing element 7 is fastened in the thrust ring 4. Provided for this purpose is a peripheral groove, which runs around in the thrust ring 4 and in which a snap ring 92 is restrained.

When the thrust ring 4 is screwed in, it presses onto the fixing element 7, with the result that the latter in turn is braced onto the clamping cone 6. When this takes place, the clamping cone 6 is both pressed together, with the result that the gap 62 decreases, and is pressed onto the spacer ring 31. The pressure on the spacer ring 31 is transferred onto the seal 3. The latter is pressed in the axial direction, consequently expands in the radial direction and thus becomes effective by the screwing in of the thrust ring 4 into an end position in the collar 2.

The fastening of the connection piece 1 in the collar 2 takes place by the clamping cone 6 being pressed together and thus being pressed against the connection piece 1. As a result, the connection piece 1 is restrained in the clamping cone 6. The clamping cone 6 and the fixing element 7 represent a clamping means, which develops its clamping action by the screwing in of the thrust ring 4 into its end position. The clamped state brought about as a result can be released only by the action of an external force.

The fastening of the connection piece 1 in the collar 2 and the restraining of the seal 3 are performed in a single operation. Virtually no damage is caused to the connection piece 1 by this restraining means, comprising the clamping cone 6, the fixing element 7 and the thrust ring 4, since the restrain forces act equally on the connection piece 1 on all sides, on a line running virtually completely around said connection piece. Should deformation nevertheless occur, it can only have the form of a uniform peripheral notching. This is, however, uncritical in the case of repeated use of the measuring device, since such deformation does not result in any impairment of the sealing quality.

When the thrust ring 4 is released, the restraint of the connection piece 1 is initially retained, since the fixing element 7 and the clamping cone 6 remain in the clamped state even without the action of the thrust ring 4. An additional force is necessary in order to release this connection. By contrast, the seal 3 loses its action immediately when the thrust ring 4 is released. Should a pressure different from the ambient pressure prevail at the measuring location, a pressure equalization will occur as the sealing effect subsides. This causes a noise to be produced, for example a whistling, by which the user is given a clear warning and can act correspondingly with safety in mind.

Figure 3A:
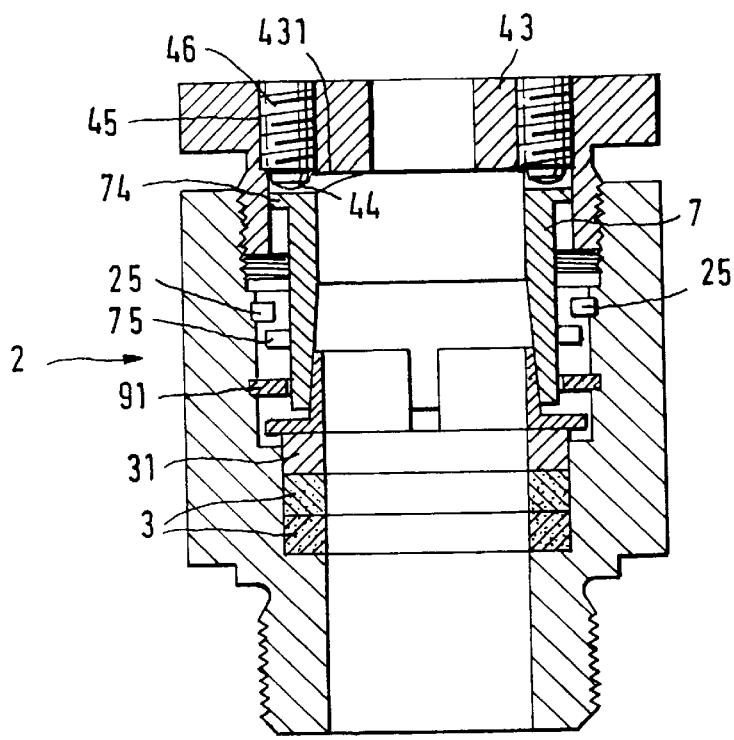
FIG. 3a shows a longitudinal section of a second exemplary embodiment of a measuring device according to the invention.

FIG. 3a shows in longitudinal section a second exemplary embodiment of a measuring device according to the invention. In the following, only those of its component parts in which it differs from the measuring device represented in FIG. 2a are described.

In the case of the measuring device represented in FIG. 3a, a first snap-in means is provided, by which a raising of the fixing element 7 in the collar 2 and/or its lifting out of the collar 2 in the direction away from the seal is possible only in at least one specific position, brought about by turning the fixing element 7 about its longitudinal axis.

The first snap-in means comprises two parts: two snap-in pins 25, which lie diametrically opposite each other in the collar 2, and a peripheral shoulder 75, which is formed on the fixing element 7 and is interrupted by two recesses 76, lying diametrically opposite each other.

Figure 3B:
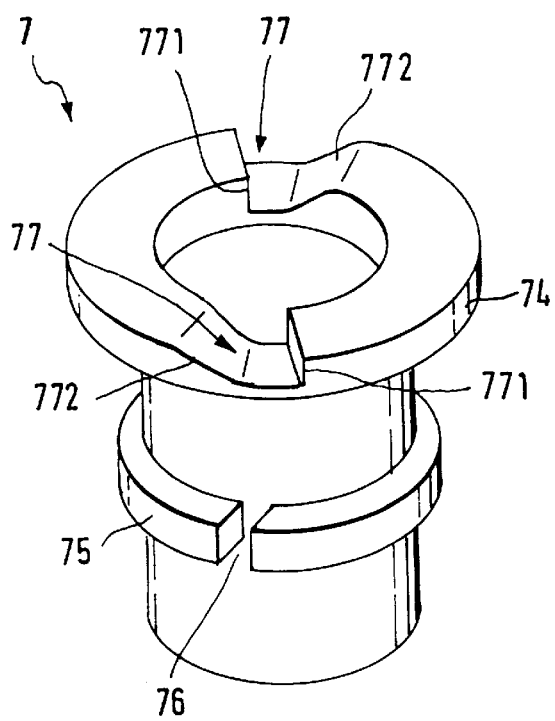

The dimensions of the shoulder 75 and of the recesses 76 are chosen such that the fixing element 7 can be taken out of the collar 2 only when the fixing element 7 has been brought into a position in which the recesses 76 are in line with the snap-in pins 25, by turning about its longitudinal axis. In all the other turning positions, the fixing element 7 is held in the collar 2 by the shoulder 75 butting against the snap-in pins 25. FIG. 3b shows a perspective view of the fixing element 7.

A second snap-in means is provided, which has two snap-in lugs 44, arranged on the annular surface 431 of the thrust ring 4, and two snap-in notches 77, arranged in the fixing element 7, in the shoulder ring 74 on its end facing toward the thrust ring. It is equally possible to use just one or more than two snap-in lugs 44 and snap-in notches 77. Two are advantageous, however, inasmuch as, with a small number of components, a symmetrical force effect is ensured during engagement and the effects of stress or canting are avoided.

Figure 3C:
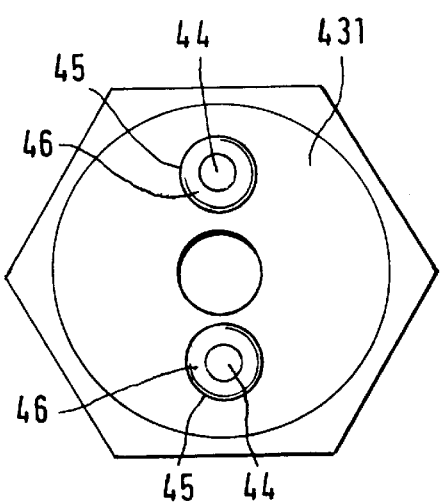
FIG. 3c shows a plan view of the side of the thrust ring from FIG. 3a facing toward the collar.

As FIG. 3c shows, the thrust ring 4 has two through-bores 45, which lie diametrically opposite each other, are arranged in the shoulder ring 43 and run parallel to the longitudinal axis of the thrust ring 4. Screwed into these bores 45 are threaded pins 46, in the interior of which the snap-in lugs 44 are fixed resiliently in the axial direction. The snap-in lugs 44 can be lowered in the threaded pins 46 by the action of an axial force.

The snap-in notches 77 are recesses which are arranged in the shoulder ring 74, on its side facing toward the thrust ring. They have in each case a step 771, as a first limitation, and a ramp 772, as a second limitation. The ramps 772 are to be provided on that side of the snap-in notch 77 over which a snap-in lug 44 located above it moves first during screwing in of the thrust ring 4. In the exemplary embodiment of FIG. 3a, the thrust ring 4 is a right-hand screw. Seen from the side facing toward the thrust ring, the ramps 772 in each case form the right-hand limitation of the snap-in notches 77.

When the measuring device is mounted, the seal 3, the spacer ring 31 and the clamping cone 6 are introduced one after the other in this sequence into the collar 2. An adequate distance in the axial direction must be provided between the snap-in pins 25 and the spacer ring 31 in order that the clamping cone 6 can be introduced at least in a slanted position. The fixing element 7 is then fitted onto the clamping cone 6. In this position, the snap-in pins 25 are located on the side of the shoulder 75 facing away from the seal. Subsequently, the thrust ring 4 is fitted onto the collar 2 and the connection piece 1 is introduced. The snap-in lugs 44 and the snap-in notches 77 do not hinder the screwing in of the thrust ring 4, since the snap-in lugs 44 slide up on the ramps 772. The sealing and restraining of the connection piece 1 are performed in precisely the same way as in the exemplary embodiment represented in FIG. 2.

If snap-in lugs 44 which can be lowered in the thrust ring 4 are used, the thrust ring 4 rests flat on the annular end surface of the fixing element 7, interrupted by the snap-in notches 77.

When the thrust ring 4 is released, the snap-in lugs 44 hook in at the steps 771. If the thrust ring 4 is turned, the connection piece 1, fixing element 7 and clamping cone 6 are likewise turned. The turning causes the thrust ring 4 to move out of the collar 2 in the axial direction. In a corresponding way, the restraint of the seal 3 is released and it becomes ineffective.

If the pressure prevailing at the measuring location is equal to the ambient pressure and the unscrewing is continued, the thrust ring 4 continues to undergo a lifting in the axial direction. As soon as this lifting is greater than the length of the snap-in lugs 44, the second snap-in means is released. The connection piece 1, fixing element 7 and clamping cone 6 are no longer turned along with the ring. The thrust ring 4 can be fully released.

If a pressure different from the ambient pressure prevails at the measuring location, the pressure equalization occurring produces a clear warning noise, for example a whistling.

If the pressure prevailing at the measuring location is greater than the ambient pressure, the thrust ring 4 cannot be fully released.

At the beginning of releasing the thrust ring 4, the seal 3 is relieved. The positive pressure prevailing at the measuring location acts via the connection piece 1 on the fixing element 7 and displaces the latter in the axial direction. It is consequently pressed against the thrust ring 4. The snap-in lugs 44 remain engaged in the snap-in notches 77, and the thrust ring 4 and fixing element 7 are moved by the turning of the thrust ring 4 in the axial direction out of the collar 2 until the first snap-in means, formed by the shoulder 75 with the recesses 76 and the snap-in pins 25, engages.

Once the fixing element 7 has engaged in the first snap-in means, it can no longer be turned. The fixing element 7 is connected to the thrust ring 4 via the second snap-in means, namely the snap-in lugs 44 engaged in the snap-in notches 77. In this state, a turning of the thrust ring 4 is not possible without a turning of the fixing element 7.

Since the thrust ring 4 can be released only by turning of the collar 2, it can be removed only when there is no positive pressure prevailing at the measuring location. Depending on the fitted position of the measuring device, the first snap-in means is then either released of its own accord, by the fixing element 7 falling in the axial direction toward the seal, due to gravity, or it can then be released by screwing in the thrust ring 4 once again and subsequently by unscrewing it fully. The renewed screwing in of the thrust ring 4 has the effect that the fixing element 7 is moving in the direction toward the seal, whereby the snap-in pins 25 are moved out of the recesses 76.

It is not possible to remove the measuring device when there is positive pressure at the measuring location. This action, which constitutes an operating error, is therefore entirely ruled out. In addition, when a pressure acts, the connection piece 1 is restrained in the clamping means. It cannot come out of the collar 2, even if a very great pressure acts on it.

Figure 4A:
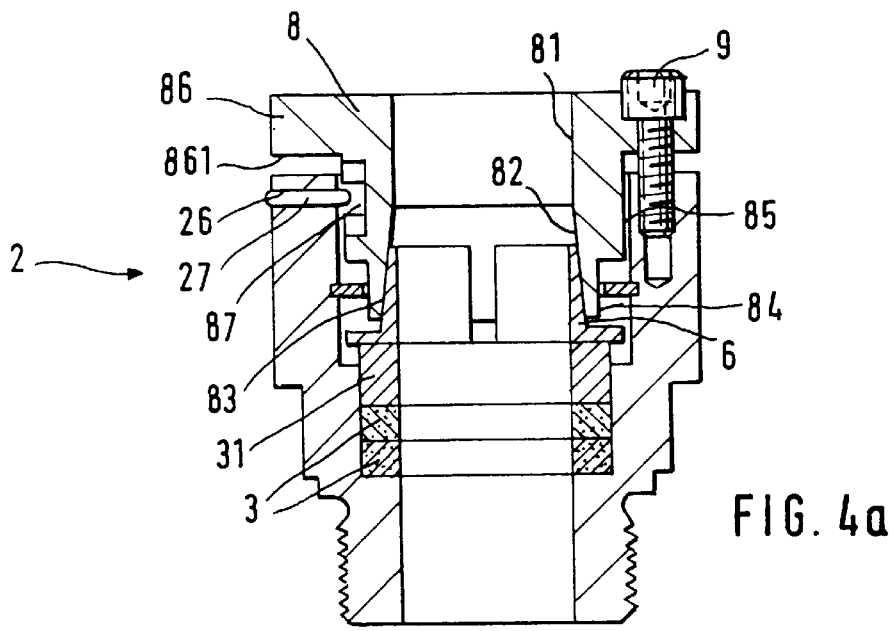
FIG. 4a shows a longitudinal section of a third exemplary embodiment of a measuring device according to the invention.
Figure 4C:
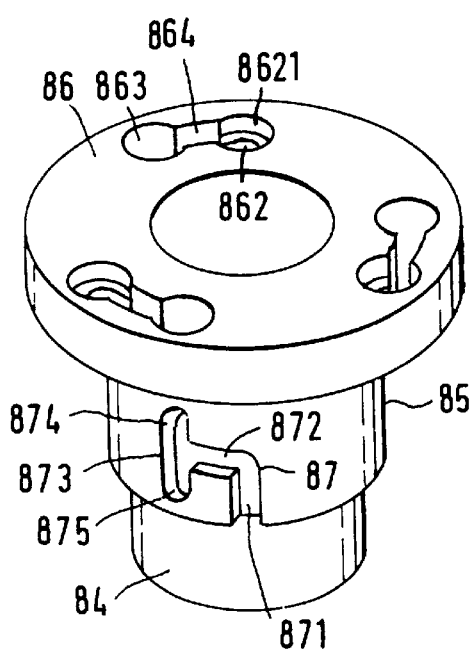
Figure 4B:
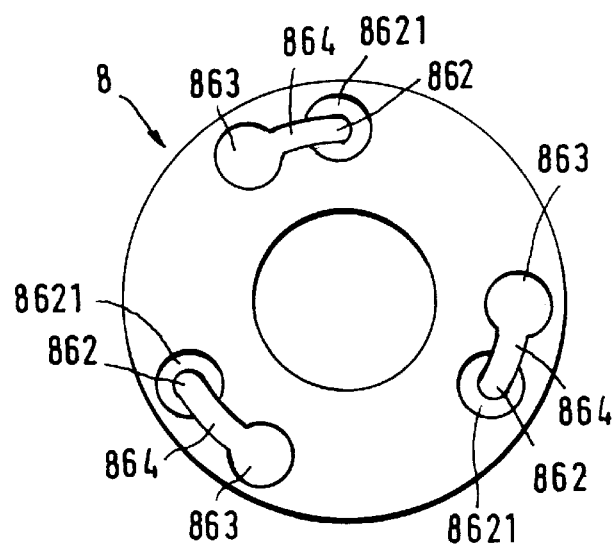
FIG. 4b shows a plan view of the side of the mounting element from FIG. 4a facing away from the collar.

A third exemplary embodiment is represented in FIGS. 4a to 4c. Here, only the differences from the preceding exemplary embodiments are described in more detail. For better overall clarity, the connection piece 1 is not represented in FIG. 4a. it can be adopted identically from FIG. 1.

In this exemplary embodiment, the fixing element and the thrust ring are designed as a single component, referred to in the following as mounting element 8. On the inside, it has two regions, a cylindrical first section 81, facing away from the seal, and a conical second section 82, facing toward the seal. The internal diameter of the section 82 increases in the direction toward the clamping cone and is adapted in its shape to the geometry of the clamping cone 6. The mounting element 8 consequently rests with an inner conical lateral surface 83 with an exact fit on the clamping cone 6.

On the outside, the mounting element 8 has a cylindrical first section 84, facing toward the seal. Adjoining this section is a second section 85 of a larger external diameter. Formed onto the free end of the second section 85 is a radially outwardly extending fastening ring 86. In the fitted state, the mounting element 8 rests with an end surface 861 of the fastening ring 86, facing toward the seal, on an annular end surface 26 of the collar 2.

The mounting element 8 is fastened on the collar 2 by three screws 9, to be screwed in through the fastening ring 86 into three bores arranged in the collar 2. For this purpose, three pairs of bores are arranged in the fastening ring 86. A first through-bore 862 and a second through-bore 863 are provided alongside eac h other. The first bore 862 has in each case an internal diameter which is smaller than the largest diameter of the screws 9, here the diameter of their head. The second bore 863 has in each case an internal diameter which is larger than the largest diameter of the screws 9. The first bore 862 and second bore 863 are in each case connected to each other by a channel 864, the width of which is smaller than the largest diameter of the screws 9.

The bores 862, which have the smaller internal diameter, have in each case at their ends facing away from the collar a section 8621, in which a section of a head of the screws 9, facing toward the thrust ring, can be countersunk.

The fastening ring 86 forms a thrust ring, and the remaining regions of the mounting element 8 form a fixing element.

A first snap-in means is provided, which has a snap-in pin 27 arranged in the collar 2. Its counterpiece is formed by a guide groove 87 arranged in the central section 85 of the mounting element 8. The snap-in pin 27 has to be pushed into said groove during mounting.

The guide groove 87 is cut into the section 85, for example milled in. It has three regions: a first entrance 871, which runs parallel to the longitudinal axis of the mounting element 8 and reaches as far as the limit between the sections 84 and 85. This entrance 871 is adjoined by a central region 872, which runs at an angle with respect to the longitudinal axis of the mounting element 8. In the exemplary embodiment, it runs at 90° thereto. This has the effect that the mounting element 8 has to be turned about its longitudinal axis in order that the snap-in lug 27 passes through this region 872 into an end region 873 adjoining the latter. This end region has two blind bores 874, 875, which run parallel to the longitudinal axis of the mounting element 8. Starting from the region 872, the blind bore 874 runs in the direction away from the seal and therefore makes possible a movement of the mounting element 8 in the direction toward the seal. Starting from the region 872, the blind bore 875 runs in the direction toward the seal and therefore makes possible a movement of the mounting element 8 in the direction away from the seal.

The first snap-in means, which comprises the guide groove 87 and the snap-in lug 27, has the effect that a raising of the mounting element 8 in the collar 2 and/or its lifting out of the collar 2 in the direction away from the seal is possible only by turning the mounting element 8 about its longitudinal axis. It is not possible to move the snap-in lug 27 in some other way through the central region 872 to the entrance 871.

When the mounting element 8 is fitted on the collar 2, the snap-in lug 27 has to be brought into line with the entrance 871 of the guide groove 87. In a way corresponding to the geometry of the guide groove 87, the mounting element 8 has to be pushed in the axial direction into the collar 2 over a distance which is equal to the length of the entrance 871. Subsequently, it has to be turned, until the snap-in lug 27 is in the end region 873 of the guide groove 87. The tightening of the screws 9 has the effect of moving the mounting element 8 into the collar 2, into an end position. This is possible only when the snap-in lug 27 is in the end region 873. only in this position, to be achieved by turning the mounting element, does the blind bore 874 allow a further displacement of the mounting element 8 in the direction toward the seal.

This displacement causes the mounting element 8 to be braced onto the clamping cone 6. When this takes place, the clamping cone 6 is both pressed together, with the result that the gap 62 decreases, and pressed onto the spacer ring 31. The pressure on the spacer ring 31 is transferred onto the seal 3. The latter is pressed in the axial direction, consequently expands in the radial direction and thus becomes effective by the screwing in of the mounting element 8.

The fastening of the connection piece 1 in the collar 2 takes place by the clamping cone 6 being pressed together and thus being pressed against the connection piece 1; it is thus restrained in the clamping cone 6. The fastening of the connection piece 1 in the collar 2 and the restraining of the seal 3 are performed in a single operation.

At the beginning of the releasing of the screws 9, and consequently of the mounting element 8, the seal 3 is relieved. A pressure prevailing at the measuring location which is different from the ambient pressure acts on the mounting element 8.

If a negative pressure prevails at the measuring location, the mounting element 8 remains in its position. The snap-in lug 27 remains in the blind bore 874. Since said bore runs parallel to the longitudinal axis of the mounting element 8, the latter cannot be turned. It cannot be removed.

If a positive pressure prevails at the measuring location, the mounting element 8 is moved in the axial direction. The heads of the screws 9 consequently remain initially in the sections 8621, and a turning of the mounting element 8 is not possible for this reason alone. With this axial displacement of the mounting element 8 facing away from the seal, the snap-in lug 27 in the end region 873 travels from the blind bore 874 into the blind bore 875, until the snap-in lug 27 reaches the closed end of the blind bore 875 and blocks a further displacement of the mounting element 8. Since the blind bore 875 runs parallel to the longitudinal axis of the mounting element 8, the latter cannot be turned. It consequently cannot be removed.

The restraining of the clamping cone 6 in the mounting element 8 is retained during this displacement, with the result that the connection piece 1 cannot be pressed out of the collar 2, or sucked into a container, by the pressure acting.

It would similarly be possible to use instead of the pairs of bores described in this exemplary embodiment single bores in each case. This would offer the advantage that the mounting element 8 is simplified and could consequently be produced at lower cost; however, it entails the disadvantage that the user has to unscrew the screws fully from the single bores before he can turn the mounting element 8. This is required both during the mounting and the demounting of the measuring device. The pairs of bores also make it clear to the user that a turning of the mounting element 8 is required. With single bores there would not be this indication.

A further exemplary embodiment of a measuring device according to the invention is a modification of the exemplary embodiment last described and represented in FIGS. 4a, 4b and 4c. According to this further embodiment, the screws 9 are fastened in the collar 2 such that they cannot be fully screwed out of the collar 2. This takes place, for example, by said screws being anchored in the interior of the collar 2. In the case of this exemplary embodiment, the guide groove 87 and the snap-in pin 27 are superfluous and are omitted. When the screws 9 are released, the mounting element 8 is displaced in the direction away from the collar by a positive pressure prevailing in the container. The sections of the heads of the screws 9 remain countersunk in the sections 8621 of the first bores 862. It is consequently not possible to turn the mounting element 8. The screws 9 consequently cannot get to the second bores 863 through the channels 864. Only when the screws 9 are in the second bores 863 can the mounting element 8 be lifted away over the screws 9 and be removed from the collar 2. In order that the mounting element 8 can be released from the collar 2, it has to be turned into this position. It cannot be turned, however, when the heads of the screws 9 are countersunk in the sections 8621. If a positive pressure prevails at the measuring location, consequently the mounting element 8 cannot be removed.

What is claimed is:

1. A measuring device comprising:
   a cylindrical connection piece,
   a collar which engages around at least one section of the connection piece and is to be fastened at a measuring location,
   a restraining means, by which the connection piece is fastened in the collar,
   an annular seal which is arranged in the collar and bears in a sealing manner against the connection piece, and
   a thrust ring which is releasably fastened in the collar and, in an end position, puts the seal under pressure in the axial direction,
   the restraining means being designed as a clamping means which can be released from a clamped state just by the action of an external force, and the clamped state being effected by the end position of the thrust ring,
   wherein, when the thrust ring is released and a positive pressure is prevailing at the measuring location, the positive pressure acts on the clamping means and displaces the thrust ring in the axial direction until the thrust ring engages in a first snap-in means for maintaining the thrust ring in a fixed position in which it cannot be released fully from the collar, and
   wherein, in the engaged state, the restraining means is connected to the thrust ring fixedly or via a second snap-in means for connecting the restraining means to the thrust ring.

2. A measuring device comprising:
   a cylindrical connection piece,
   a collar which engages around at least one section of the connection piece and is to be fastened at a measuring location,
   a restraining means by which the connection piece is fastened in the collar,
   an annular seal which is arranged in the collar and bears in a sealing manner against the connection piece, and
   a thrust ring which is releasably fastened in the collar and, in an end position, puts the seal under pressure in the axial direction,
   the restraining means being designed as a clamping means which can be released from a clamped state just by the action of an external force, and the clamped state being effected by the end position of the thrust ring,
   wherein the thrust ring can be separated from the collar only by at least one turn about its longitudinal axis,
   wherein the thrust ring is fastened on the collar by means of at least one screw arranged parallel to the longitudinal axis of the thrust ring, and
   wherein the thrust ring includes
   a first bore and a second bore,
   the first bore having an internal diameter which is smaller than the largest screw diameter,
   the second bore having an internal diameter which is larger than the largest screw diameter, and
   the first bore and the second bore being connected to each other by a channel,
   the width of the channel being smaller than the largest screw diameter.

3. The measuring device according to claim 2, wherein the first bore has at its end facing away from the collar in each case a section in which a section of the screw head of the screws, facing toward the thrust ring, is countersunk, and in that the screws cannot be unscrewed fully from the collar.

4. A measuring device comprising:
   a cylindrical connection piece,
   a collar which engages around at least one section of the connection piece and is to be fastened at a measuring location,
   a restraining means, by which the connection piece is fastened in the collar,
   an annular seal which is arranged in the collar and bears in a sealing manner against the connection piece,
   a thrust ring which is releasably fastened in the collar and, in an end position, puts the seal under pressure in the axial direction,
   the restraining means being designed as a clamping means which can be released from a clamped state just by the action of an external force, and the clamped state being effected by the end position of the thrust ring,
   the clamping means having
   a clamping cone with an axial through-bore and a through-gap, running in the axial direction, and
   a fixing element with an inner conical lateral surface, the fixing element being pressed onto the clamping cone by the thrust ring, and
   a first snap-in means for allowing a raising of the fixing element in the collar and/or a lifting out of the fixing element from the collar in the direction away from the seal only in at least one specific position, the at least one specific position being brought about by turning the fixing element about its longitudinal axis.

5. The measuring device according to claim 4, wherein the first snap-in means if formed by
   at least one guide groove, arranged in the fixing element, into which groove the snap-in pin has to be pushed during mounting of the fixing element, the fixing element undergoing a turning about its longitudinal axis.

6. The measuring device according to claim 5, wherein the guide groove has at least one blind bore,
   which runs parallel to the longitudinal axis of the fixing element.

7. A measuring device comprising
   a cylindrical connection piece,
   a collar which engages around at least one section of the connection piece and is to be fastened at a measuring location,
   a restraining means, by which the connection piece is fastened in the collar,
   an annular seal which is arranged in the collar and bears in a sealing manner against the connection piece, and a thrust ring which is releasably fastened in the collar and, in an end position, puts the seal under pressure in the axial direction, the restraining means being designed as a clamping means which can be released from a clamped state just by the action of an external force, and the clamped state being effected by the end position of the thrust ring, the clamping means having
- a clamping cone with an axial through-bore and a through-gap, running in the axial direction, and
- a fixing element with an inner conical lateral surface, the fixing element being pressed onto the clamping cone by the thrust ring, wherein, when a pressure is prevailing at the measuring location, the pressure acts on the fixing element when the thrust ring is released and displaces said fixing element in the axial direction until the fixing element engages in a first snap-in means for maintaining the fixing element in a fixed position in which it cannot be released fully from the collar.

8. The measuring device according to claim 7, wherein the fixing element
- cannot be turned in the engaged state and
- is connected to the thrust ring fixedly or via a second snap-in means for connecting the fixing element to the thrust ring, with the result that a turning of the thrust ring is possible only with a turning of the fixing element and the thrust ring can be released from the collar only by the turning.

\* \* \* \* \*